MULTIAPERTURE THIN FILM MAGNETIC MEMORY

INVENTOR
BRUCE I. BERTELSEN

BY Bertram M. Mullin
ATTORNEY

United States Patent Office 3,432,822
Patented Mar. 11, 1969

3,432,822

MULTIAPERTURE THIN FILM MAGNETIC MEMORY

Bruce I. Bertelsen, Poughkeepsie, N.Y., assignor to International Business Machines Corporation, New York, N.Y., a corporation of New York Filed May 26, 1964, Ser. No. 370,159
U.S. Cl. 340—174 5 Claims
Int. Cl. G11b 5/00

ABSTRACT OF THE DISCLOSURE

A continuous magnetic thin film storage array is provided where the area of each magnetic storage region is defined by an apertured conductive plate adjacent thereto. The intersections of orthogonal drive lines are disposed over the apertures of the conductive plate thereby defining bit sites. The flux in the bit sites directly below an aperture is rapidly switched while that beneath the conductive plate is inhibited from switching because of eddy currents developed within the plate.

This invention relates to magnetic devices, and, in particular, to magnetic thin film storage and switching devices capable of assuming a plurality of stable magnetic states in response to electrical signals applied thereto.

Ever since it was found that 80–20 Ni-Fe film exhibited uniaxial anisotropy, when evaporated in the presence of a magnetic field, efforts have been initiated to implement these films into storage and switching devices. These magnetic thin films have two stabe states along the preferred axis of magnetization, which is also called the easy direction. The reversal of magnetization from one stable state to the other takes place in very short times on the order of nanoseconds ($10^{-9}$ seconds). These properties are most desirable for utilization in the storage and switching of intelligence in data processing and computer machines.

Various magnetic thin film devices are presently available. These devices usually include an evaporated or electroplated deposit of discrete dots of magnetic film having uniaxial anisotropy on a substrate. Drive and sense lines are positioned over these discrete dots. Usually at least two drive lines are employed with one line, the word line, positioned parallel to the easy axis of the dot and the other line, the bit line, positioned orthogonal thereto.

Intelligence is stored in a discrete magnetic dot by several schemes. In one of the more conventional schemes, the two stable states along the preferred direction of magnetization, the easy axis, are utilized. For example, with binary intelligence, a one is represented by orienting the magnetization vector in one direction along the easy axis while a binary zero is represented by orienting the magnetization vector in the opposite direction, that is, orienting the magnetization vector at an angle of 180° to that utilized for the binary one. Combinations of signals transmitted along both the word and the bit line are required for orienting the magnetization vector. A signal is first applied along the word line. A few nanoseconds later, following the activation of the word lines, a signal is applied along the bit line. The polarity of the bit signal determines the sense of the stored information. Then the signals transmitted along the word line are deactivated and the field produced by the bit signals left to orient the magnetization vector. Reading is achieved with the application of pulses along these word lines.

Rather than using a pattern of discrete dots for the storage of intelligence, it has been suggested to employ large area films, that is, continuous films, and select discrete elemental areas in the films by means of defined magnetic fields. In a continuous film, the rotation of the magnetization vector is more nearly coherent and better approximates that which theory predicts in comparison to that which is presently available from deposited discrete dots. This permits lower bit fields to switch the magnetization vector, yields higher signals, and decreases the demagnetizing fields. One reason for this is the effective dispersion in a continuous film is reduced, dispersion being the average deviation of the easy axis for an elemental segment of the film as compared to the average direction of the easy axis for the entire film. Further, it was felt a continuous film would furnish a more rapid storage and retrieval of intelligence and would do away with the masking and the etching techniques required in the present fabrication procedures for discrete magnetic dots.

To attain greater electrical coupling between the drive lines and the continuous magnetic film, more complete switching with the fields produced by the drive lines, and to sense more of the singal on output, continuous magnetic films have been deposited on conductive substrates so that image currents are induced in the conductive substrate when signals in the drive and sense lines are changed. These image currents, it was thought, would increase the field at the film and provide more switching field for a given current, thereby contributing to the tighter coupling of the device. However, it has been found, in practice, that the image currents induced in the metallic substrate are not well confined to the area beneath the desired bit. The image currents tend to spread throughout the metallic substrate, thereby causing a reduction of the effective fields and hindering the reversal of the magnetization vector.

In addition, other problems have appeared in attempting to implement a magnetic continuous film into a storage device. The packing density, that is, the number of bits (one unit) of intelligence storable in a given area is limited. Where a large number of bits are packed relatively close one to the other, problems arise in selectively rotating the magnetization vector in a designated bit, without affecting the direction of the magnetization vector in adjacent bits. In a continuous magnetic film, the area directly beneath the region, where the field word drive line intersects the bit drive line, is the bit, and, successful operation of the device depends on the degree to which the effect of the field produced by these drive lines is confined to the area directly beneath their intersection. However since the magnetic film is continuous, the field produced at these intersections, by the activation of selected drive lines, spreads through the film and disturbs the orientation of the magnetization vector at adjacent locations. Further, when a selected word line is activated to rotate magnetization vector of a designated bit, the area surrounding the bit is similarly influenced by the applied field and, it becomes difficult to distinguish intelligence from noise. To maintain reliability and avoid loss of information, the packing density in a continuous film is low as the results of this disturb problem. Accordingly, it has been an object of considerable research therefore to circumvent these limitations encountered with magnetic continuous thin films and realize the advantages available with them.

What has been discovered is that many of these difficulties heretofore mentioned are overcome with a magnetic continuous thin film device, by actively confining the fields, for rotating or switching the magnetization vector to ascertainable areas. This is done by providing means for producing arresting fields about a bit, so that upon the application of a switching field to a designated bit only the magnetic material within the bit is permitted to switch.

Accordingly it is an object of this invention to provide an improved magnetic thin film device which overcomes the heretofore mentioned disadvantages.

It is a further object of this invention to provide an improved thin film magnetic device having increased reliability and speed.

It is yet another object of this invention to provide an improved magnetic continuous thin film storage device capable of storing intelligence at high densities.

It is still another object of this invention to provide an improved magnetic continuous film storage capable of storing intelligence at high densities with low drive fields.

Briefly, these and other objects of the invention are realized when a thin conductive layer or sheet is interposed between the magnetic continuous thin film and the drive-sense line layers. The conductive layer includes apertures positioned within the conductive material which conform to the bit areas, designated by the intersection of the superimposed drive lines. The field, developed on activation of the word and bit lines, reaches the film only in the regions defined by the apertures while those areas on magnetic film enclosed by the conductive layer are not affected. When the drive lines are activated to produce a switching field, in a given direction, arresting fields as a result of eddy currents develop in the conductive layer. At an aperture where the magnetic film is exposed, the bit experiences the field and the magnetization vector rotates in accordance with the direction of the applied field. However, in those adjacent areas of magnetic film surrounding the bit, although they provide a flux path for the applied field through these areas, are inhibited in changing their magnetic state as a result of the eddy currents in the conductive layer. This assures more accurate discrimination between intelligence and noise on sensing. With this apertured conductor, bits are well defined on a continuous magnetic film wherever a word line intersects a bit line. Upon activation of these drive lines, the magnetization vector in the region beneath them is oriented without affecting adjacent regions, other than to allow the reduction of demagnetization fields at the bit by slow (wall motion) switching. Further, bit regions of the film need not be physically isolated from other regions or from each other, nor are etching or masking techniques required in the preparation of the magnetic surface. A device is provided which achieves the advantages heretofore sought in the art. High output signals, low bit drive currents, minimized demagnetization effects, high bit packing densities, effective noise cancellation, and few disturb problems are available with the instant device.

Though the mechanism brought about by the use of the conductive layer, namely, flux trapping, has heretofore been used in various memory schemes, their implementation has required that each aperture representing a binary one, intersect the drive and sense lines at a different angle than the apertures representing a binary zero. Or, that the apertures surrounding a bit storing a one have a different geometrical configuration from an aperture surrounding a bit storing a binary zero. Apertures and conductive sheets of this type lack regularity, uniformity, and are costly to make, in comparison to that available with the instant invention. Further, the mode of operation of these prior art devices limits the adaptation of a particular bit site to the storage of only one form of intelligence. While these prior art memory schemes are satisfactory for some purposes, their arrangement is not very suitable for a magnetic thin film memory device where flexibility, versatility and reliability are required in the performance of the device.

The foregoing and other objects, features and advantages of the instant invention will be apparent from the following more particular description of preferred embodiments of the invention as illustrated in the accompanying drawings.

Figure 1:
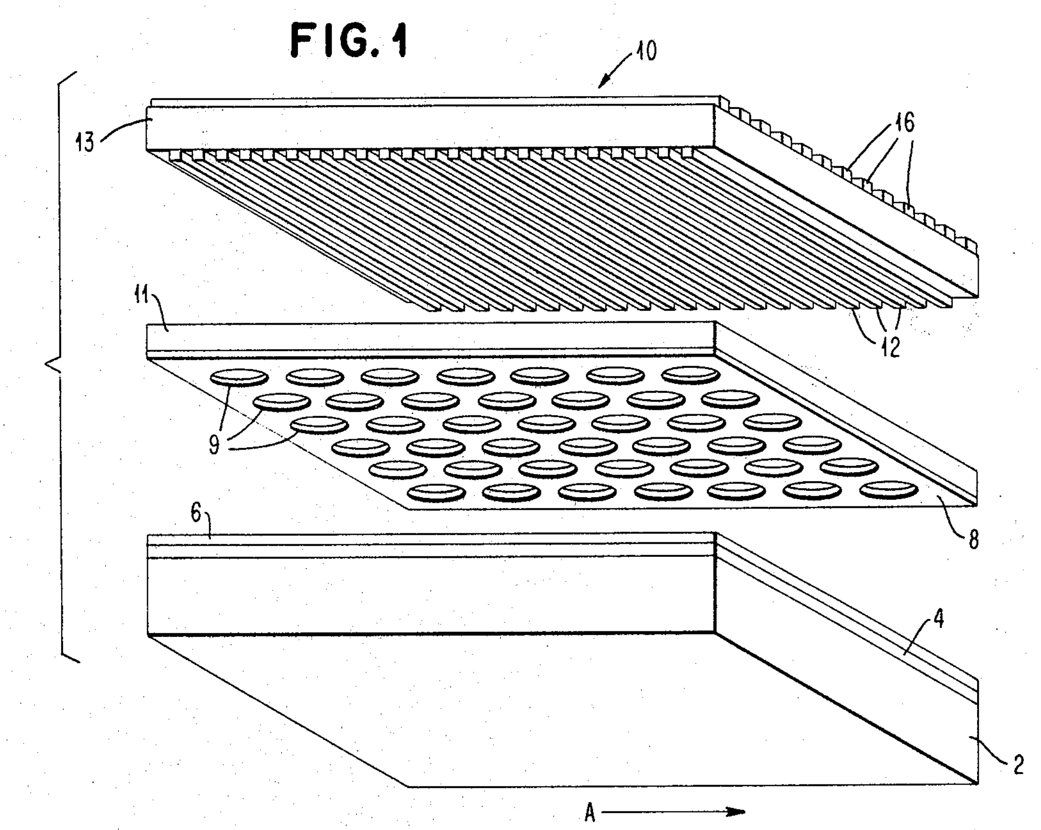
FIGURE 1 is a perspective view of one form of the magnetic device of the present invention.

Referring now to FIGURE 1 where one form of the present invention is illustrated, there is shown magnetic device 10 which includes a conductive base or substrate 2 over which is superimposed a layer of silicon monoxide 4. Continnuous magnetic film 6, formed from Permalloy, having a preferred direction of magnetization, the easy axis, in the direction as indicated by arrow A, is positioned over the silicon monoxide 4. Over the continuous magnetic film 6 is superimposed aperture conductive layer 8. A set of conductive lines 12 which are parallel one to the other but separated from each other, are superimposed over the apertured plate transverse to the easy axis of the device. A second set of conductive lines 16, which are parallel one to the other but separated from each other, are superimposed over the first set 12 but are placed such that their longitudinal axis is parallel to the easy axis of the device and are separated from lines 12 by insulator 13.

Conductive substrate 2, which is formed from copper, aluminum, or silver, or the like, with a thickness of about 0.08 inch provides the return path for the conductive lines 12 and 16 and also reinforces the switching field provided by these conductive lines. This provides for a more compact device and furnishes a greater switching field for a given current. The conductive plate serves as a reflecting surface which forms an image of the conductive lines 12 and 16 in such a manner that the image causes a magnetic field to add to that brought about by the conductive lines 12 and 16. The confinement of field under the line is caused by eddy currents induced in the conductive plate. As previously discussed, the image currents induced in the conductive substrate are not well confined to the areas beneath the bits but rather spread through the device when long trains of pulses are applied. With the apertured conductor layer 8 in the device, the disadvantages of the metallic base are minimized and the advantages of its utilization enhanced.

The silicon monoxide layer 4 is deposited by conventional vacuum deposition techniques to a thickness of about 5000 A. or so. The silicon monoxide layer, besides serving as insulation, improves reproducibility and is effective in reducing roughness of the substrate surface. With it, control is furnished over the coercivity of the film enabling uniform switching characteristics throughout the magnetic film.

Continuous magnetic film 6 is deposited on a surface of the silicon monoxide layer 4 while the conductive substrate is maintained at a temperature of about 300° C. to 400° C. High temperatures are used to attain high wall motion coercive force which reduces disturb sensitivity, and, lets interaction by wall motion creep under the copper layer. While the magnetic film 6, which has a composition similar to that of Permalloy, that is, it includes between 15 to 35 percent by weight iron, and 65 to 76 percent by weight nickel, and preferably about 80 percent by weight nickel and 20 percent by weight iron, is deposited, a magnetic field is applied in the direction in which the easy axis is desired. The field varies between 25 to 75 oersteds. Magnetic film 6 is continuous and is grown to a thickness which varies from 500 to 5000 A.

Apertured conductive layer 8 which is superimposed over the continuous magnetic film, contains a uniform pattern of apertures 9 which may be circular, rectangular, or elliptical in form. Each aperture 9 is of the same geometry and of the same dimensions as its neighbor. These apertures are arranged in rows and columns and form a uniform network of bit cells. Every aperture, except for those at the perimeter of the conductive layer, has identical surroundings. The grouping of the bit sites, that is, the apertures, about any given point is identical with the grouping about any other bit site in the network.

The apertured conductive layer is formed, for example, from copper clad polyethylene terephthalate film 11, positive photoresist is placed on the surface of the copper clad film, baked and exposed to a carbon arc light through a photographic bit pattern negative. The copper clad material is then developed, washed, dried, and baked again. This leaves a resist coating between apertures, the bit sites, which is removed with ferric chloride which results in an apertured conductive layer as shown.

Figure 2:
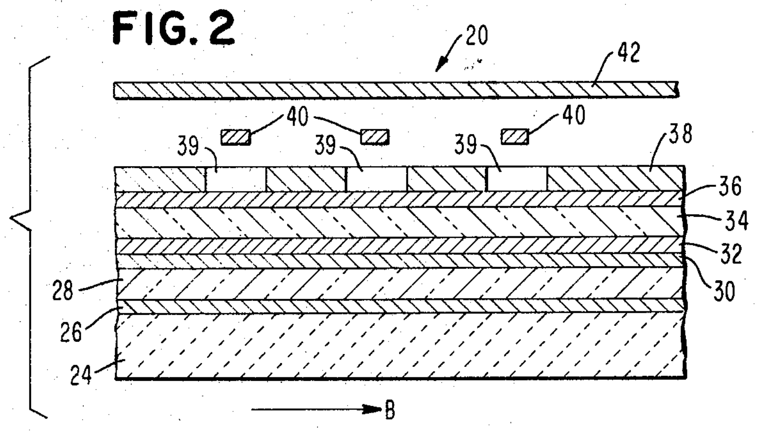
FIGURE 2 is a cross-sectional view of another embodiment of the present invention.

Now with reference to FIGURE 2, another form of the invention is shown. Magnetic device 20 includes a conductive substrate 24, a layer of chromium 26 is superimposed over the conductive substrate. Over chromium layer 26 a layer of silicon monoxide is deposited. The chromium increases the adhesion forces and provides a more strongly bonded compact. It provides a source of metal nuclei for bonding the several layers to the substrate and is especially useful when a discontinuous process is utilized to fabricate the storage device. The silicon monoxide 28 is deposited for the purposes as previously discussed. Over silicon monoxide layer 28, continuous magnetic film 30, having a preferred direction of magnetization as indicated by arrow B, is superimposed. Another layer of chromium 32 is deposited over the continuous magnetic film 30, about 300 to 700 A. in thickness. A further layer of silicon monoxide 34 is then deposited over the chromium layer 32. To further increase the adhesion forces, chromium layer 36 of about 300 to 600 A. in thickness is superimposed and bonded to silicon monoxide layer 34. A continuous copper layer 38 is then vacuum deposited onto chromium layer 36. Standard etching techniques are then used to form the apertures 39. As shown, the apertured copper layer includes in cross-section, alternate regions of copper and aperture. A first set of conductive lines 40 are positioned over the apertures such that they are orthogonal to the easy axis of magnetization. A second set of conductive lines 42 are superimposed over the first set with their longitudinal axis parallel to the easy axis of the magnetic film. Note that each aperture which is a bit site is beneath at least one conductive member from both the conductive set 40 and from the conductive set 42 and that each of these conductive lines are orthogonal one to the other in spaced relationship to the aperture.

Figure 5:
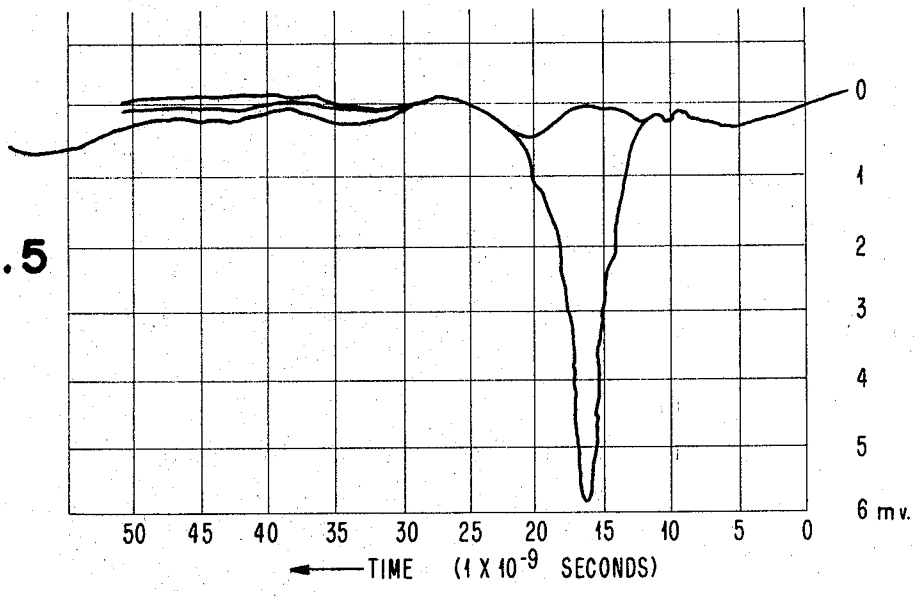
FIGURE 5 is a graphical representation of the signal output as represented by a plot of millivolts versus time.
Figure 6:
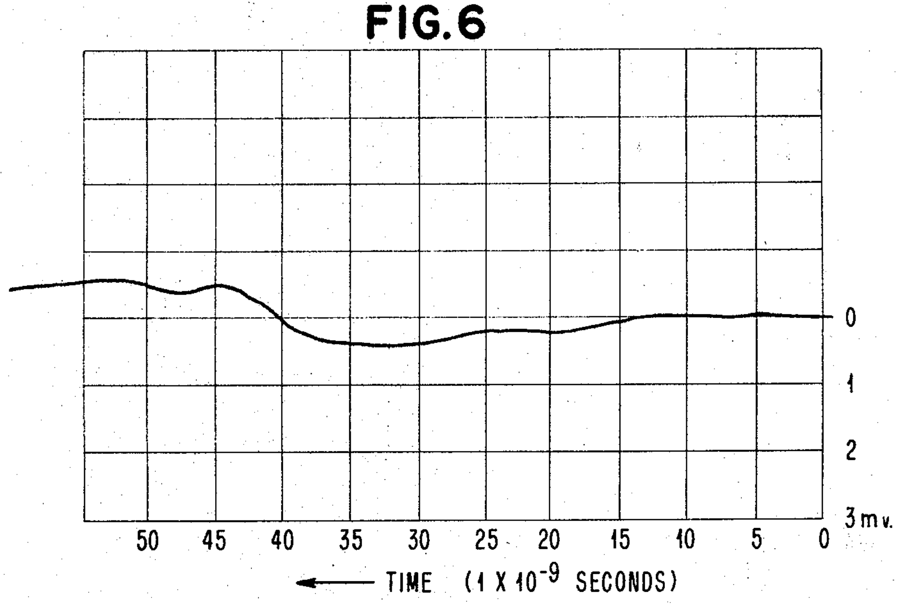
FIGURE 6 is a graphical representation of the noise signal as represented by a plot of millivolts versus time.

When the conductive lines are activated, the magnetic material directly beneath the aperture and beneath the intersection of the conductive lines experiences a magnetic field. The magnetic film in juxtaposition to the area defined by the aperture is not affected by the applied field. This, as previously discussed, results from the eddy currents which are induced in a copper material adjacent to the aperture and directly above the juxtaposed material. An output signal sensed on the switching of material, as defined by an aperture and an intersection of conductive lines, produces a signal of the form depicted in FIGURE 5, while the noise output takes the form of a waveform as represented by FIGURE 6. Were the apertured plate to be removed from the surface of the continuous film, the noise signal would also assume the waveform as represented by FIGURE 5. In a device where an apertured copper layer is not used, the conductive lines upon activation produce a field which is not accurately confined to the area directly beneath its intersection. Magnetic material adjacent to the area beneath the intersection experiences the applied field also. This produces extraneous signals of essentially the same amplitude and magnitude as that for an intelligence signal which makes it most difficult to distinguish one from the other.

Figure 3:
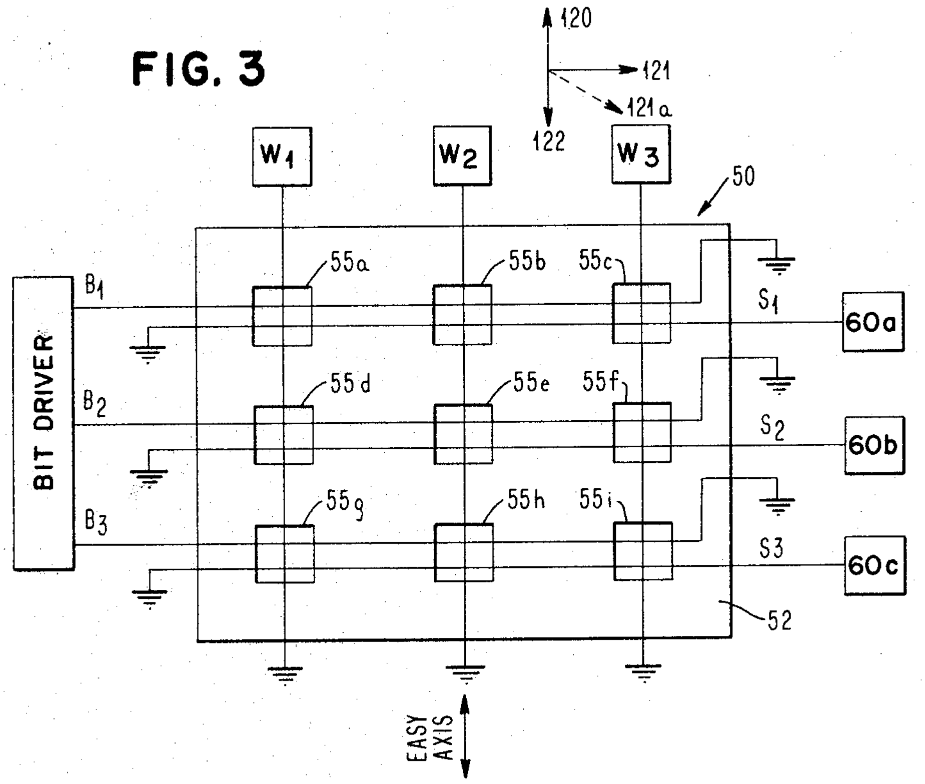
FIGURE 3 is a schematic view of a storage array formed with a magnetic device of the present invention.

The magnetic devices illustrated in FIGURES 1 and 2 may form part of a storage matrix 50 such as that illustrated in FIGURE 3. Each of the apertures 55*a–i*, of conductive layer 52, which represents a bit site, are arranged in rows and columns such that the conductors associated therewith, that is, the word lines $W_1$–$W_3$, bit lines $B_1$–$B_3$, and sense lines $S_1$–$S_3$, are disposed in such a manner that the word lines $W_1$–$W_3$ are substantially perpendicular to the bit lines $B_1$–$B_3$ and the sense lines $S_1$–$S_3$. An aperture is located wherever a word line intersects a bit line. Each of the word lines $W_1$–$W_3$ is coupled at one end to a word driver and connected at the other end to ground or terminated in its characteristic impedance. Each of the bit lines $B_1$–$B_3$ is connected at one end to a bit driver and connected at the other end to ground or its characteristic impedance, and each of the sense lines is coupled at one end to a load 60*a*–60*c* and is connected at the other end to ground or its characteristic impedance. Although the bit and sense lines are shown as separate lines, if desired the same line may be used for both functions.

Figure 9:
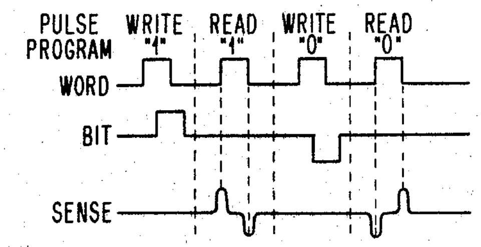
FIGURE 9 is a representation of a pulse program required for operating the device of the present invention.

Since the word lines $W_1$–$W_3$ are positioned parallel to the preferred axis of magnetization, that is, the easy axis, both states of magnetization lie along the axis of the word lines. For purposes of discussion a binary zero is in the direction of vector 120 and a binary one in the direction of vector 122. To store a zero at bit site 55*b* when the magnetization vector is rotated in the direction of vector 122, a pulse program such as that illustrated in FIGURE 9 is utilized. The word line $W_2$ is activated, the field produced by the word line is transverse to the easy axis of magnetization. This rotates the magnetization vector to a position a little less than 90° from its original position such that it assumes a position similar to that illustrated by vector 121*a*. A few nanoseconds after the word pulse line $W_2$ is activated, bit line $B_1$ is activated with the polarity of the applied signal being such as to produce a field in the direction of the easy axis and oriented toward vector 120. The word line is then deactivated, the bit field left to orient the magnetization vector in the direction of the applied field, that is, toward vector 120. To store a binary one when the magnetization vector is originally in the zero state, the same procedure is followed except that the polarity of the bit field is reversed to that used to store a one.

To read information stored in a particular bit site only requires the activation of the word line. Upon the activation of the required word line, the magnetization vector rotates away from its stable state, this induces a signal in the sense lines which is transmitted to the load 60.

The requirements of the bit pulses are that they be large enough to assure complete rotation either to the right or left but small enough not to disturb bits on other word lines. The word pulse program merely requires that its field be large enough to drive all bits into the hard direction. In principle there is no upper limit to its magnitude.

Figure 4:
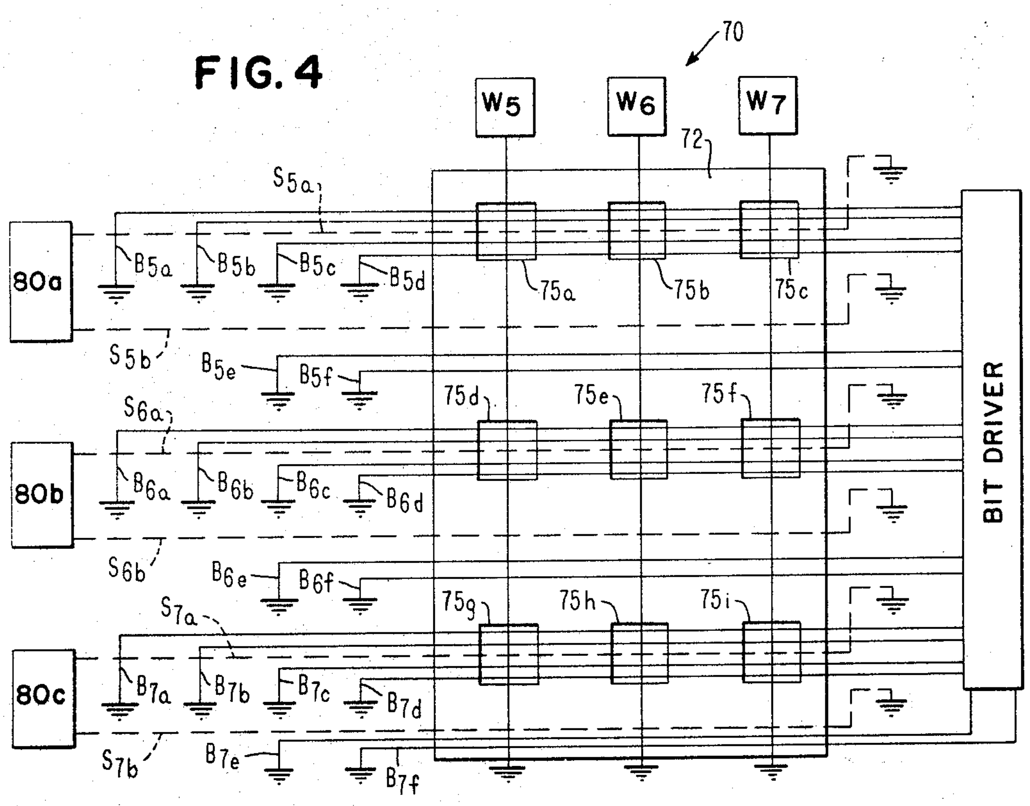
FIGURE 4 is an other schematic view of a storage array formed with a magnetic device of the present invention.

To assure more complete switching of the magnetic material confined within an aperture and to more accurately discriminate between noise and intelligence, several bit lines per aperture, and, reference sense and bit lines are used as in storage array 70 as shown in FIGURE 4. There the conductive layer 72 has apertures 75*a*–75*i* arranged in rows and columns such as shown in FIGURE 3. Word lines $W_5$–$W_7$ are superimposed over the apertures with each of the word lines positioned parallel to the easy axis of the magnetic material. The word lines are coupled at one end to word rivers and are connected at the other end to ground. ach aperture is under four bit lines with a sense line /mmetrically centered between the bit lines. For ex- mple, apertures 75*a*, 75*d* and 75*g* are positioned eneath bit lines $B_{5a}$–$B_{5d}$, $B_{6a}$–$B_{6d}$ and $B_{7a}$–$B_{7d}$, re- pectively. Positioned adjacent to each of the apertures e reference sense lines and bit lines. For example, eference sense line $S_{5d}$ and reference bit lines $B_{5e}$ and $_{5f}$ are positioned adjacent to apertures 75*a*, 75*b* and 5*c*. Reference sense lines $S_{6b}$ and reference bit lines $B_{6e}$ nd $B_{6f}$ are positioned adjacent to apertures 75*d*, 75*e* nd 75*f* and, similarly, reference sense line $S_{7b}$ and refer- nce bit lines $B_{7e}$ and $B_{7f}$ are positioned adjacent to pertures 75*g*–75*i*. Each of the bit lines is coupled at ne end to a bit driver and is connected at the other nd to ground or its characteristic impedance. Each of ne sense lines is coupled at one end to a differential sense mplifier and is connected at the other end to ground r its characteristic impedance. Each sense line and its omplementary reference sense line is coupled to the ame differential sense amplifier. For example, $S_{5a}$ and eference sense $S_{5b}$ are coupled to differential sense ampli- er 80*a*. Similarly, sense line $S_{6a}$ and reference sense line $_{6b}$ are coupled to differential sense amplifier 80*b* and ense line $S_{7a}$ and its reference line $S_{7b}$ are coupled to ifferential sense amplifier 80*c*. Reading and writing are ccomplished with the device as described for FIGURE , but with several differences.

The bit pulses for switching an aperture are transmitted long all the bit lines that are superimposed above an perture. For example, where it is desired to write into ne magnetic material confined within aperture 75*b*, ord line $W_6$ is activated as heretofore discussed, a few anoseconds later, the bit pulses of appropriate polarity epending on whether it is desired to store a one or a ero are transmitted along bit lines $B_{5a}$–$B_{5d}$. With four it lines positioned symmetrically about the aperture, nore complete switching of the magnetic material is ccomplished.

To read out information stored in an aperture, the equired word line is activated. For example, if aperture 5*e* were interrogated, word line $W_6$ is activated. The eld produced by the word line causes the magnetization ector representing the stored material to rotate away om the easy axis. Rotation of the magnetic material in- uces a voltage along sense line $S_{6a}$. The induced voltage transmitted along the sense line to the differential sense mplifier 80*b*. Coupled to the differential sense amplifier reference sense line $S_6B$. Any extraneous signals pro- uced by the word line or from any other noise sources bout the aperture are transmitted along sense line $S_{6b}$. hese noise signals are cancelled from the intelligence ignals at the differential sense amplifier and accurate dis- rimination between intelligence and noise is permitted nere.

The reference sense lines are placed in an environment hich is similar to the environment which the actual sense nes are in. Each of the reference sense lines $S_{6b}$, $S_{6b}$ and $_{6c}$ are adjacent to reference bit lines $B_{5e}$–$B_{6f}$, $B_{6e}$–$B_{6f}$ nd $B_{7e}$–$B_{7f}$. This is to assure that the reference sense nes experience the same type of fields and stray signals s the actual sense lines do.

A comparison of the magnetic characteristics for a nagnetic continuous film device having an apertured onductor with a magnetic continuous film device which oes not employ one is provided by the S curve of FIG- JRES 7 and 8. These curves illustrate the disturb sensi- ivity characteristics of the devices, that is, the measure f the ability of a film to remain in a selected remanent tate in the presence of stray fields; the more disturb sensi- ve a film is, the more precisely must the switching fields onform to specified magnitudes and directions.

These curves are obtained, in general, by maintaining ne word pulse constant and varying the bit pulse over ne ranges indicated in the figures. For example, wave- forms 90 and 90′ are obtained by writing in an element with a unipolar word pulse of about 640 milliamperes in amplitude having a 20 nanosecond pulse width and 6 nanosecond rise time. This is in coincidence with a bit pulse having a total width at maximum amplitude of about 55 nanoseconds with an amplitude increasing from 0 to 300 milliamperes with a rise time of 30 nanoseconds. Once the information is stored, reading is accomplished with the application of another word pulse. Curves 91 and 91′ are obtained in a similar fashion to that for curves 90 and 90′, but, after a bit pulse is applied, the stored information is disturbed by applying from 500 to 1000 bit pulses of the appropriate polarity having an amplitude 50% higher than the required bit pulse. Wave- forms 92 and 92′ are obtained in a similar manner to that used for waveforms 91 and 91′, but, in addition, disturb signals are transmitted along an adjacent word line, that is, a word line of an adjacent bit, to examine the effect of the combined word and bit disturb current.

These curves give an indication of the available signal output for sensing intelligence in the operation of the memory elements. What is desired, in such an S-curve, is that the residual signals after disturb be large over a wide range of bit currents and in particular, it is desired that the signals be large at low bit currents, that is, the curves rise fast from the origin. It is also desired that the curves of the disturbed waveforms be fairly close to the curves of the undisturbed waveforms, that is, it is desired that waveforms 91 and 92 approximate the shape of the undisturbed signal 90. As these conditions are obtained with the S-curve, large signals are obtained, a wide range of bit currents including bit currents of low amplitude are available for switching the intelligence in the memory element, lowering the uniformity require- ments for the elements in a large memory. Also, the intel- ligence in the memory is not readily eliminated by acci- dentally applied stray fields or through the influence of adjacent fields. On the other hand, if these conditions are not met by the S-curve, that is, if the residual signals after disturb are small, if they are not approximately of the same signal magnitude, if the range of bit currents yielding large signals is narrow, the film yields a low signal on sensing and acquires very uniform memory elements with exactly the same range of usable bit cur- rents. Further, the element has little resistance to the influence of stray fields.

Figure 8:
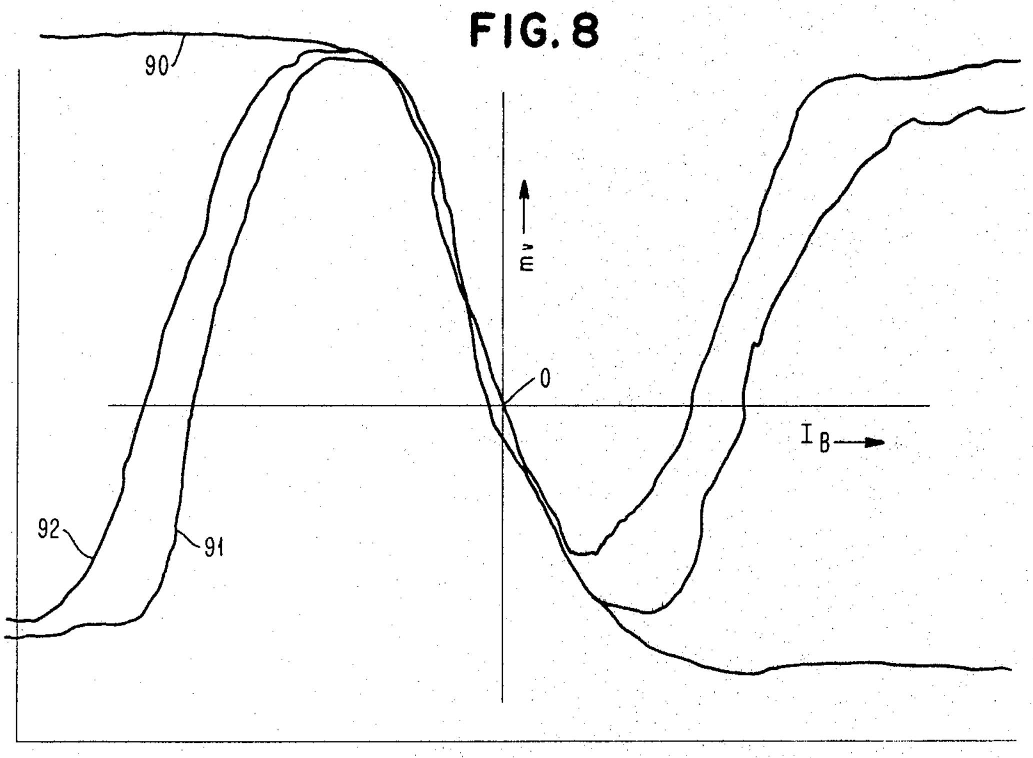
FIGURE 8 is a graphical representation of the output signals available with the present invention as represented by a plot of millivolts versus constant bit current.
Figure 7:
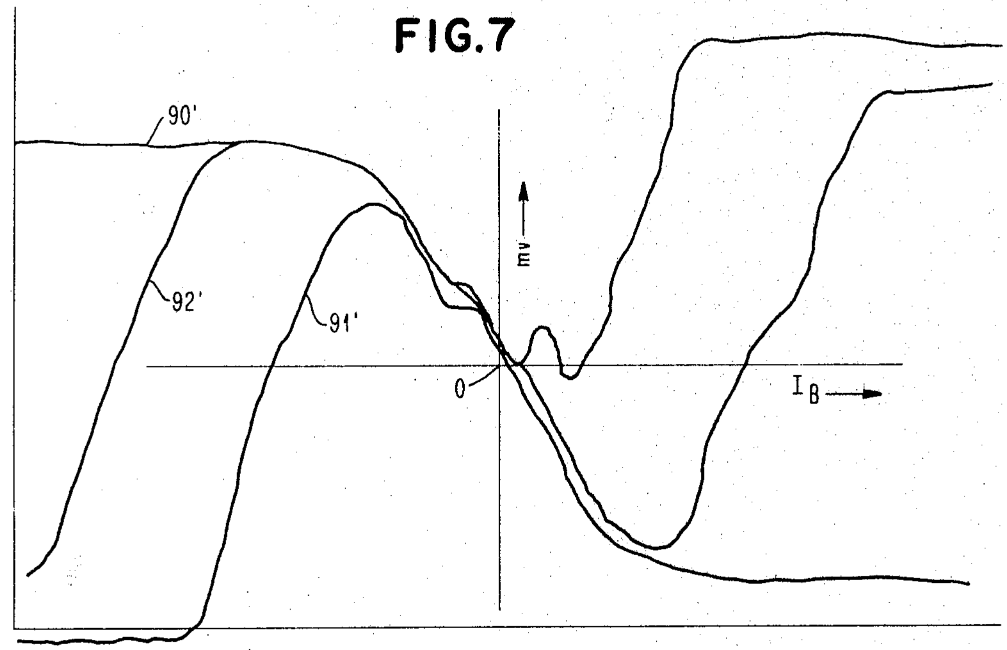
FIGURE 7 is a graphical representation of the output signals for a magnetic continuous thin film memory device, without an apertured conductive layer, as represented by a plot of millivolts versus bit current.

What is noted when the waveforms of FIGURE 7 are compared with those of FIGURE 8 is that the magnetic device with the apertured conductor yields signals of a higher magnitude which are less disturb sensitive than that of the magnetic device lacking the apertured con- ductor. This provides for more accurate sensing of intel- ligence, lowers drive requirements and increases relia- bility, all of which make for a more useful device.

While the invention has been particularly shown and described with reference to preferred embodiments there- of, it will be understood by those skilled in the art that various changes in form and details may be made therein without departing from the spirit and scope of the inven- tion.

What is claimed is:

1. A magnetic storage device comprising:

a continuous anisotropic magnetic film having at least two stable states of remanence along a preferred easy direction of magnetization, said magnetic film being superimposed over a substrate;

a conductive member superimposed over said magnetic film and inductive coupled thereto, said conductive member having apertures therein to expose the mag- netic film, a first means for applying a field to switch the rema- nence including a plurality of conductors superim- posed over said apertures placed orthogonal to the easy axis of magnetic films; and a second means for applying a field to switch the remanences including a plurality of conductors superimposed over said apertures placed parallel to the easy axis of magnetic film, where said second means is operative with said first means for producing a field for switching the magnetization from one of its said stable states to the other of the stable states.

2. A magnetic storage device compirsing:
a conductive base portion;
a continuous magnetic film having uniaxial anisotropy and having at least two stable states of remanence along the preferred easy direction of magnetization, said magnetic film being superimposed over said conductive base portion;
a conductive member superimposed over said magnetic film and inductive coupled thereto, said conductive member having a network of uniform apertures such that the grouping of apertures about any given point in the network is identical with the grouping of other apertures about a second given point;
a first means for applying a field to switch the remanence including a plurality of conductors superimposed over said network of apertures and placed orthogonal to the easy axis of the magnetic films; and,
a second means for applying a field to switch the remanences including a plurality of conductors superimposed over the network of apertures and placed parallel to the easy axis of the magnetic film where said second means is operative with said first means for producing a field for switching the magnetization from one of its stable states to the other of its stable states.

3. A magnetic storage device comprising:
a conductive base portion;
a continuous magnetic film having uniaxial anisotropy and having at least two stable states of remanence along a preferred easy direction of magnetization, said magnetic film being superimposed over said conductive base portion;
a second conductive member superimposed over said magnetic film and inductively coupled thereto, said second conductive member having a plurality of apertures arranged in rows and columns forming a network of uniform apertures such that a first grouping of apertures about any given aperture in a network is identical with the grouping of other apertures about a second given aperture;
a first means for applying a field to said film, including a plurality of conductors superimposed over said second conductive member and positioned orthogonal to the easy axis of the film; and,
a second means for applying a field to said film, including a second plurality of conductors superimposed over said second conductive member and positioned parallel to the easy axis of said film where said conductors from said first means and said conductors from said second means are in quadrature above each of the apertures of the second conductive member and, further, where activation of said conductors, in quadrature, over said apertures, to apply a field to said film, switches the remanence from one of its magnetization states to the other of its magnetization states.

4. A magnetic storage device comprising:
a conductive base portion;
a continuous magnetic film having uniaxial anisotropy and having at least two stable states of remanence along a preferred easy direction of magnetization, said magnetic film being superimposed over said conductive base portion;
a second conductive member superimposed over said magnetic film and inductively coupled thereto, said second conductive member having a network of uniform apertures such that the grouping of apertures about any given aperture in a network is identical with the grouping of other apertures about a second given aperture;
a first means including a plurality of conductors superimposed over said network of apertures and positioned transverse to the easy axis of the film; and,
a second means including a first and second set of conductors positioned parallel to the easy axis of said film, said first set of conductors being superimposed over said apertures and said second set of conductors being superimposed between said apertures and above said second conductive member for sensing stray signals between apertures, where said conductors from said first means and said conductors from said first set, from said second means, are in quadrature, above each of said apertures forming a matrix, further where activation of said conductors in quadrature over said apertures switches said magnetic film confined within said apertures from one of its stable states of remanence to the other of its stable states.

5. A magnetic storage device comprising the combination of:
a conductive base portion;
a first layer of chromium superimposed over said conductive base portion;
a first layer of silicon monoxide superimposed over said chromium layer;
a continuous magnetic film superimposed over said silicon monoxide layer, said continuous magnetic film having uniaxial anisotropy and having at least two stable states of remanence along a preferred easy direction of magnetization;
a second layer of chromium superimposed over said continuous magnetic film;
a second layer of silicon monoxide superimposed over said second layer of chromium;
a third layer of chromium superimposed over said second layer of silicon monoxide;
a second conductive member superimposed over said third chromium layer and inductively coupled to said continuous magnetic film, said second conductive member having a network of uniform apertures such that the grouping of apertures about any given aperture in a network is identical with the grouping of other apertures about a second given aperture;
a first means including a plurality of conductive lines superimposed over said network of apertures and positioned transverse to the easy axis of the continuous magnetic film; and,
a second means including a first and second set of conductive lines positioned parallel to the easy axis of said film, said first set of conductive lines being superimposed between said apertures and above said second set of conductive lines are superimposed between said apertures and above said second conductive member, where said conductive lines from said first means and said conductive lines from said first set from said second means are in quadrature above each of said apertures forming a matrix and further where activation of said conductive lines in quadrature over said apertures switches said magnetic film confined within said apertures from one of its stable states of remanence to the other of its stable states.

References Cited

UNITED STATES PATENTS

| | | | |
|---|---|---|---|
| 3,176,277 | 3/1965 | Weisz et al. | 340—174 |
| 3,154,766 | 10/1964 | Bittmann | 340—174 |
| 3,098,997 | 7/1963 | Means | 340—173 |

JAMES W. MOFFITT, *Primary Examiner.*